United States Patent
West

(10) Patent No.: US 12,508,854 B2
(45) Date of Patent: Dec. 30, 2025

(54) TRUCK TOWING SYSTEM

(71) Applicant: Truckmovers.com, Inc., Independence, MO (US)

(72) Inventor: Dean West, Richland, MO (US)

(73) Assignee: Truckmovers.com, Inc., Independence, MO (US)

( * ) Notice: Subject to any disclaimer, the term of this patent is extended or adjusted under 35 U.S.C. 154(b) by 495 days.

(21) Appl. No.: 18/096,792

(22) Filed: Jan. 13, 2023

(65) Prior Publication Data

US 2023/0226863 A1    Jul. 20, 2023

Related U.S. Application Data

(60) Provisional application No. 63/300,405, filed on Jan. 18, 2022.

(51) Int. Cl.
| | |
|---|---|
| *B60D 1/18* | (2006.01) |
| *B60D 1/00* | (2006.01) |
| *B60D 1/14* | (2006.01) |

(52) U.S. Cl.
CPC .............. *B60D 1/18* (2013.01); *B60D 1/143* (2013.01); *B60D 2001/001* (2013.01)

(58) Field of Classification Search
CPC ....................... B60D 1/18–1/187; B60P 3/125
See application file for complete search history.

(56) References Cited

U.S. PATENT DOCUMENTS

| | | | | |
|---|---|---|---|---|
| 2,913,131 | A * | 11/1959 | Holmes | B60P 3/125 280/493 |
| 3,310,186 | A * | 3/1967 | Wegener | B60P 3/125 D12/162 |
| 4,949,985 | A | 8/1990 | Lichter | |
| 5,163,803 | A | 11/1992 | Marola | |
| 5,249,911 | A | 10/1993 | Marola | |
| 7,267,354 | B2 * | 9/2007 | Cunningham | B60D 1/38 280/495 |
| 7,789,411 | B2 * | 9/2010 | Schuettenberg | B60D 1/465 280/402 |
| 8,251,394 | B2 | 8/2012 | Watkins | |
| 8,371,599 | B2 | 2/2013 | Duvall et al. | |
| 8,613,583 | B1 | 12/2013 | Watkins | |
| 8,622,413 | B2 | 1/2014 | Schuettenberg | |
| 8,876,139 | B2 * | 11/2014 | Duvall | B60D 1/155 280/402 |
| 9,114,677 | B2 | 8/2015 | Schuettenberg | |
| 9,636,957 | B2 | 5/2017 | Duvall et al. | |
| 9,637,039 | B1 | 5/2017 | Vildosola et al. | |
| 9,643,657 | B2 | 5/2017 | West | |
| 9,776,672 | B2 | 10/2017 | West | |
| 11,247,517 | B2 | 2/2022 | Schuettenberg | |

(Continued)

*Primary Examiner* — Kevin Hurley
(74) *Attorney, Agent, or Firm* — Polsinelli PC

(57) ABSTRACT

A truck towing system is described. The truck towing system provides for a first truck to tow a second truck in a back to front relationship, i.e., the front portion of the second truck (the towed truck) is connected or attached to a rear portion of the first truck (the towing truck). The truck towing system includes an upper member to connect with a first truck. A middle member joins the upper member and a lower member in a fixed engagement. The lower member supports a front portion of a second truck. The beam member connects to a rear portion of the second truck using a cross-bar assembly.

30 Claims, 9 Drawing Sheets

(56) References Cited

U.S. PATENT DOCUMENTS

2012/0146312 A1  6/2012 Duvall et al.
2012/0313347 A1  12/2012 Schuettenberg
2021/0347419 A1* 11/2021 Watson ................... B60R 11/06
2022/0242497 A1*  8/2022 West ...................... B60D 1/145

* cited by examiner

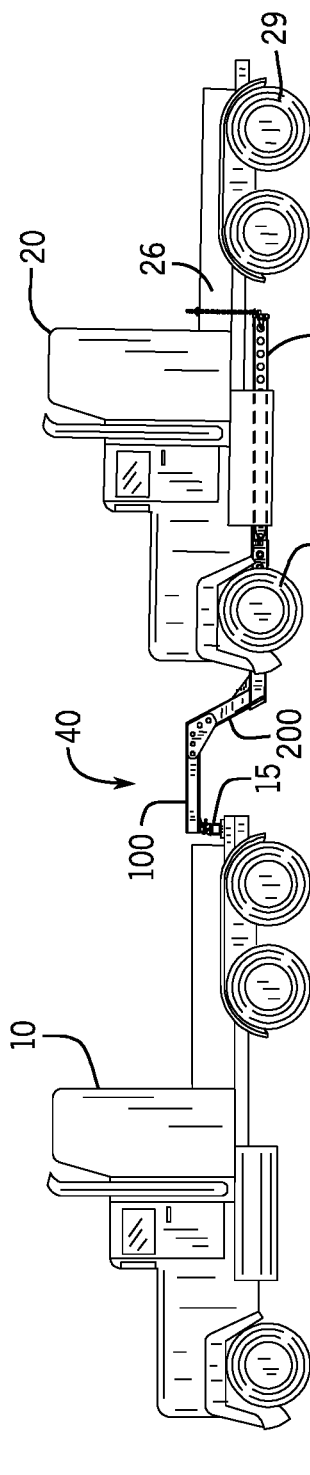
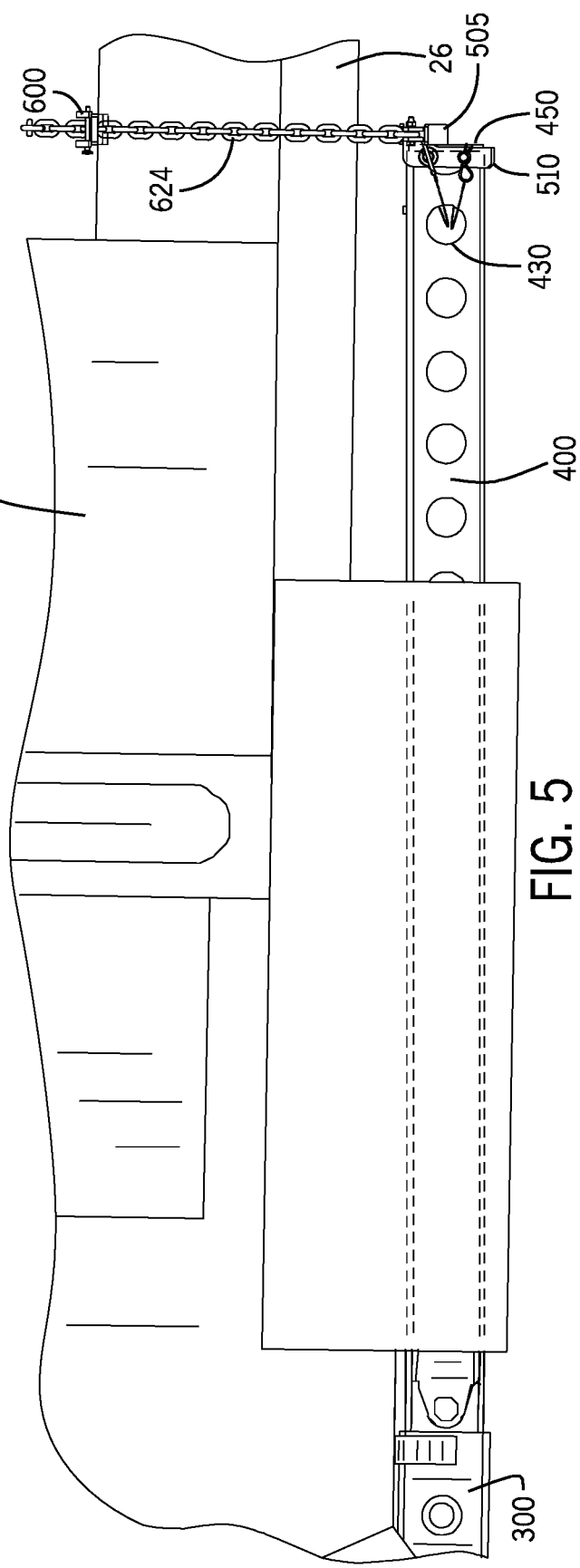

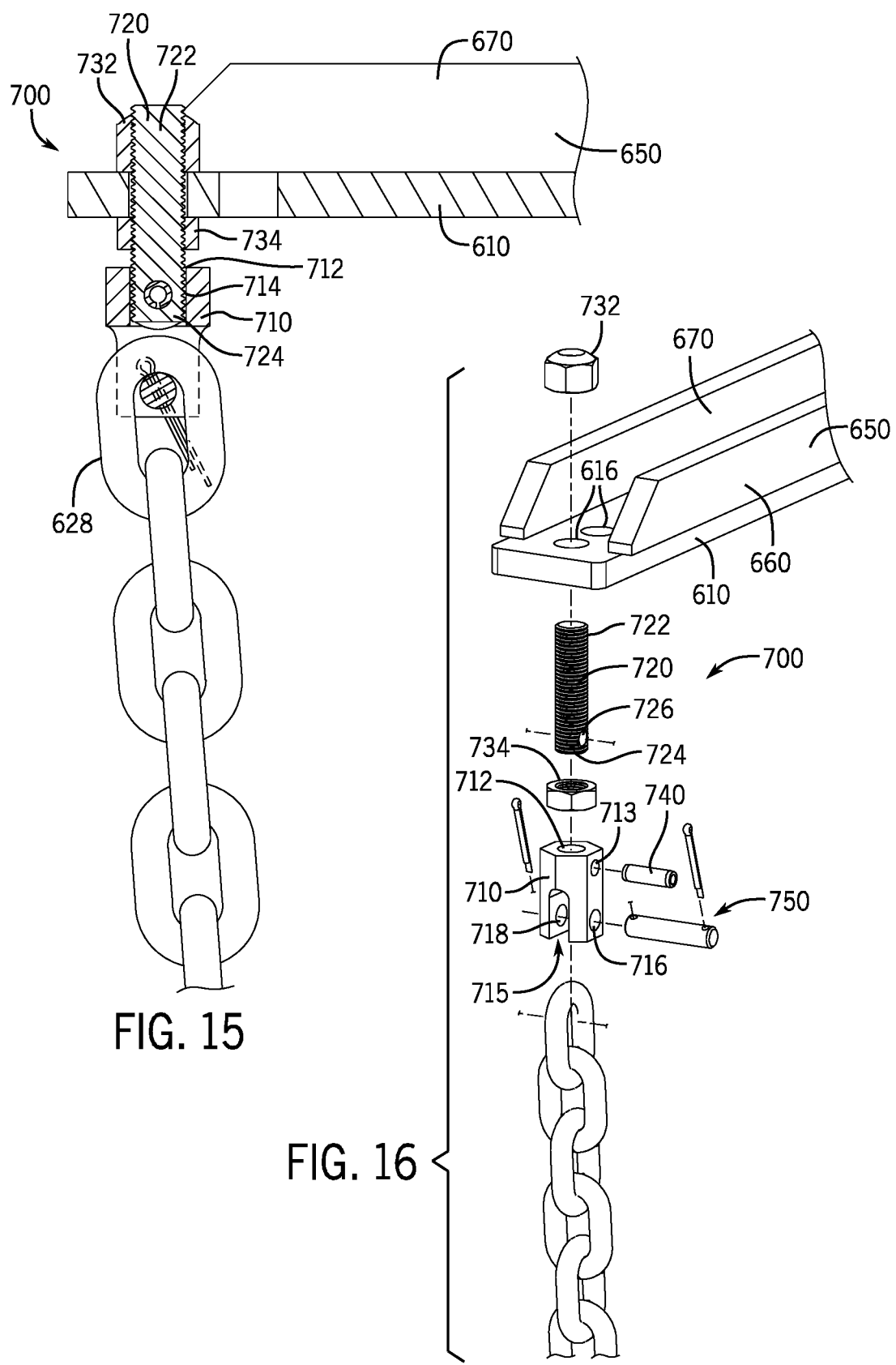

TRUCK TOWING SYSTEM

The present application claims priority to U.S. Provisional Patent Application No. 63/300,405 filed Jan. 18, 2022, which is hereby incorporated by reference in its entirety.

FIELD OF INVENTION

The present invention relates to a truck towing system.

BACKGROUND OF INVENTION

Previous attempts of towing or transporting semi-trucks have used a method called "decking," in which a first truck tows a second truck with an axle assembly of the second truck positioned over a portion or frame of the first truck. The method does not work with many modern trucks that have an increased height, since a top of the second truck will be too high off of the ground resulting in problems passing through tunnels or under over-passes and possible violation of laws or regulations directed to maximum vehicle height.

Other attempts in towing semi-trucks use a method in which the truck that is being towed is towed in reverse. This method is fuel inefficient, since the towed truck is moving in a direction counter to its aerodynamic design. Further, towing in reverse may damage the suspension or the air fairings of the towed truck.

U.S. Pat. Nos. 8,371,599, 8,876,139, and 9,636,957, all assigned to Truckmovers.COM, Inc. of Kansas City, Missouri are hereby incorporated by reference. These patents improve on the previous attempts in the towing of semi-trucks.

SUMMARY OF INVENTION

A truck towing system is herein described. The truck towing system provide for a first truck to tow a second truck in a back to front relationship, i.e., the front portion of the second truck (the towed truck) is connected or attached to a rear portion of the first truck (the towing truck). This allows the first truck to tow the second truck in a fuel-efficient manner, as trucks are not generally designed to be aerodynamic when driven in or pulled in a reverse direction.

A truck towing system utilized a cross-bar assembly configured to function with electronic vehicles or trucks, which include batteries, components, and electrical motor parts positioned in or filling a rear frame of the towed truck. The cross-bar assembly includes a lower cross-bar and an upper cross-bar connected by chains or other connectors. The cross-bar assembly is dimensioned to position the chains or other connectors outside of the rear frame of the towed truck. Thus, the batteries, components, and electrical motor parts do not usually interfere with the chains or other connectors. The upper cross-bar may rest or be positioned on a top of the rear frame of the towed truck.

The truck towing system also allows for the towed truck to be maintained at a height where a top surface or a roof of the towed truck is maintained below approximately 13 feet, 6 inches, which is a typical maximum height for safe clearance on most highways and interstates. Many of today's semi-trucks are built with cabins or condos above and behind the driver's seat in the cab. These areas may contain a bed or other storage area. These additions to the cab create extra height that must be accommodated by the towing equipment.

The truck towing system allows a single driver to move two or more trucks to a destination. This reduces labor and travel costs since two drivers are not required.

The truck towing system further provides for the towed truck to have its rear wheels on the ground, while its front wheels are lifted. This provides the driver of the first truck with better control over the second truck. This also reduces the likelihood of the towed trucked to start "snaking," which may result in a loss of control.

The truck towing system is adjustable to accommodate different sized semi-trucks. The truck towing system may extend or retract depending on the length of the towed vehicle.

The truck towing system further collapses into a collapsed configuration that has a reduced size. In the collapsed configuration, the system may be easily lifted with a crane, a hoist, or other lifting apparatus. In the collapsed configuration, a center of gravity of the system is positioned approximately in the middle of the collapsed towing system, thus allowing an easy two point attachment to the collapsed towing system. Further, the collapsed configuration provides for more efficient storage and transportation of multiple towing systems.

In one aspect, a truck towing system is provided. The truck towing system includes an upper member configured to removably engage or connect with a first truck. The truck towing system includes a lower member which joins the upper member in a fixed engagement. The lower member is configured to support a front portion of a second truck. The truck towing system includes a beam member. The beam member is engaged to the lower member. The beam member is configured to connect to a rear portion of the second truck. The truck towing system includes a cross-bar assembly having a lower cross-bar and an upper cross-bar. The lower cross-bar is configured to connect or engage to a rear end of the beam member. The upper cross-bar is configured to position on or engage with a frame of the second truck.

In one aspect, a truck towing system is provided. The truck towing system includes an upper member configured to removably engage or connect with a towing truck. The truck towing system includes a lower member, which joins the upper member in a fixed engagement. The lower member is configured to support a front portion of a towed truck. The truck towing system includes a beam member. The beam member is engaged to the lower member. The truck towing system includes a cross-bar assembly having a lower cross-bar and an upper cross-bar. The upper cross-bar rests on or engages to a frame of the towed truck. The lower cross-bar is configured to connect or engage to the upper cross-bar via chains or other connectors, and the lower cross-bar and the upper cross-bar are configured to position the chains or other connectors outside of a frame of the towed truck. The beam member is configured to connect or engage with the lower cross-bar.

In another aspect, a cross-bar assembly for a truck towing system is provided. The cross-bar assembly includes a lower cross-bar. The lower cross-bar is configured to connect or engage to a rear end of a beam member of a truck towing system. The cross-bar assembly includes an upper cross-bar. The upper cross-bar is configured to connect or engage to a frame of a towed truck. The lower cross-bar includes a first lower lateral side and a second lower lateral side. The first lower lateral side and the second lower lateral side extend outward and beyond a width of the frame of the towed truck. The upper cross-bar includes a first upper lateral side and a second upper lateral side. The first upper lateral side and the second upper lateral side extend outward and beyond the width of the frame of the towed truck.

In another aspect, a cross-bar assembly for a truck towing system is provided. The cross-bar assembly includes a lower cross-bar and an upper cross-bar. The lower cross-bar includes a first lower lateral side and a second lower lateral side. A coupling member is positioned between the first lower lateral side and the second lower lateral side. The coupling member is configured to receive a rear end of a beam member of the truck towing system.

In another aspect, a method of engaging a truck towing system to a first truck and a second truck is described. The method includes providing a truck towing system, including an upper member configured to removably engage or connect with a first truck; a lower member, wherein the lower member joins the upper member in a fixed engagement; the lower member configured to support a front portion of a second truck; a beam member, the beam member engaged to the lower member; and a cross-bar assembly comprising a lower cross-bar and an upper cross-bar. The method includes engaging the lower cross-bar to the beam member. The method includes positioning the upper cross-bar to a frame of the second truck. The method includes connecting the lower cross-bar and the upper cross-bar with chains or other connectors. The method may additionally include passing the chains or other connectors outside of the frame of the second truck.

DESCRIPTION OF FIGURES

FIG. 4 is a view of the first truck towing the second truck with the truck towing system.

FIG. 5 is a side view of the connection between the rear end of the beam member and the cross-bar assembly.

FIG. 15 is a sectional view of the cross-bar assembly with the connection assembly.

FIG. 16 is an exploded view of the cross-bar assembly with the connection assembly.

DETAILED DESCRIPTION OF INVENTION

Figure 1:
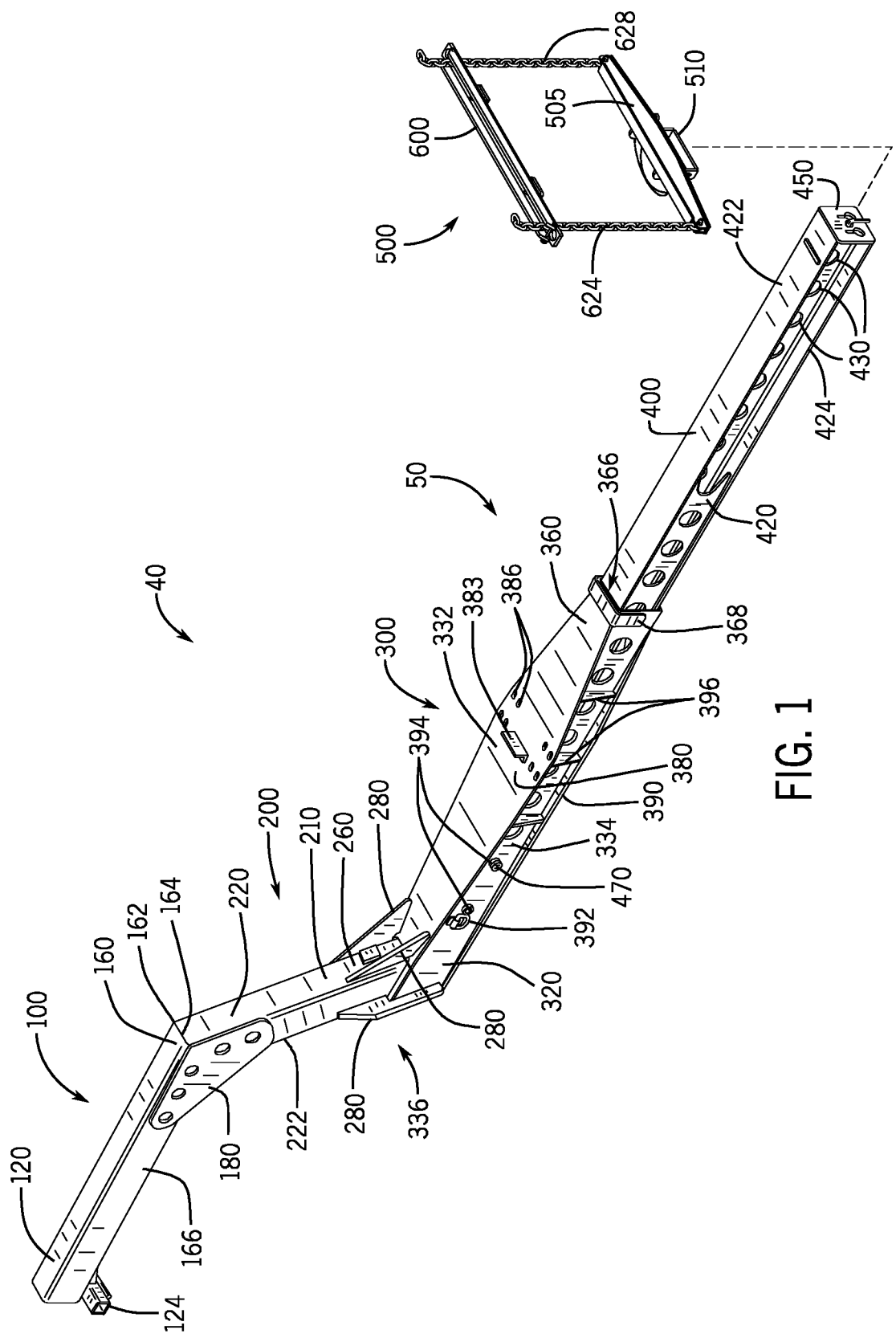
FIG. 1 is a perspective view of the truck towing system.

The truck towing system will now be described with reference to FIGS. 1-16. A truck towing system 40 is shown in FIG. 1. With reference to FIG. 4, the system 40 connects to a rear portion of a first truck 10 and to a front portion of a second truck 20. The first truck 10 is the towing truck, while the second truck 20 is the towed truck. The second truck 20 is towed in a forward direction. A third truck may also be towed by the second truck 20 in a similar manner using an additional towing system 40.

In this aspect, the first truck 10 includes a conventional saddle mount 15, which receives the towing system 40 in a fixed and locking connection. In other aspects, the first truck 10 may include a fifth wheel mount or other hitches and mounts which receive or engage the towing system 40.

A front axle assembly of the second truck 20 rests on the towing system 40. A rear frame 26 of the second truck 20 is locked, by chains or otherwise clamping, to the towing system 40. Rear wheels tandem 29 of the second truck 20 are in contact with the ground and roll as the first truck 10 pulls or tows the second truck 20. Accordingly, the second truck 20 is being pulled in the direction in which the second truck 20 was aerodynamically designed. As such, pulling the second truck 20 in the forward direction results in fuel economy savings as the first truck 10 is performing reduced work verses towing the second truck 20 in a backward manner.

The towing system 40 includes an upper member 100, a middle member 200, and a lower member 300. Each of the members 100, 200, and 300 include a generally linear length of a rigid and strong metal or metal alloy. Each of the members 100, 200, and 300 may be formed from solid, hollow or partially hollow sections of square tubing or stock. The members 100, 200, and 300 may be made from low to medium strength carbon steel. The upper member 100 is connected to the middle member 200, and the middle member 200 is connected to the lower member 300. The upper member 100, the middle member 200, and the lower member 300 may be fixedly connected to each other, or the members 100, 200 and 300 may be an integral structure. In the embodiment shown in the FIGURES, the upper member 100 is welded to the middle member 200, and the middle member 200 is welded to the lower member 300. Typically, none of the upper member 100, the middle member 200, and the lower member 300 move or pivot relative to each other.

The upper member 100 is orientated in a range of approximately parallel to the lower member 300 or slightly angling toward a plane of the lower member 300 in an amount of approximately 2 degrees to 5 degrees in the direction attaching toward the first truck 10. The upper member 100 is separated from the lower member 300 by the middle member 200. The middle member 200 joins an end of the upper member 100 with an end of the lower member 300.

The upper member 100 includes a front portion 120 and a rear portion 160. The front portion 120 connects to or attaches to the saddle mount 15 of the first truck 10. In the embodiment shown in the FIGURES, the upper member 100 includes a saddle mount portion 124 that is fixedly connected to the saddle mount 15 of the first truck 10. The saddle mount portion 124 is positioned or fixed on a bottom surface 122 of the upper member 100. The saddle mount connection between the saddle mount 15 and the saddle mount portion 124 is a fixed or non-moving engagement.

The rear portion 160 of the upper member 100 includes a rear end 162 that defines rear surfaces 164. The rear end 162 and the rear surfaces 164 are fixedly connected by welding or other fasteners to the middle member 200. The upper member 100 further includes side surfaces 166. Connecting plates 180 connect the side surfaces 166 of the upper member 100 with side surfaces 222 of the middle member

200. The connecting plates 180 strengthen or reinforce the connection or bond between the upper member 100 and the middle member 200.

The middle member 200 includes an upper portion 220 and a lower portion 260. The upper portion 220 is fixed or connected to the rear portion 160 of the upper member 100. The middle member 200 is fixed or connected to the upper member 100 at an angle of approximately 100 degrees to approximately 150 degrees. This range of angles provides for the lower member 300 to be at the proper position for connecting to the second truck 20. With reference to FIG. 1, the upper portion 220 includes an upper surface 210, the side surfaces 222, and the rear surface. The upper surface 210 receives angled support plates 280 in a fixed or permanent connection that further connects the middle member 200 with the lower member 300.

The lower member 300 will now be described with reference to FIG. 1. The lower portion 260 of the middle member 200 is fixed or connected to a front portion 320 of the lower member 300. The middle member 200 is fixed or connected to the lower member 300 at an angle of approximately 100 degrees to approximately 150 degrees. The lower member 300 includes the front portion 320 and a rear portion 360. The front axle assembly of the second truck 20 is positioned or mounted on a top surface 332 of the lower member 300.

The lower member 300 further includes a front opening 336 and a rear opening 366. The front opening 336 is positioned below the middle member 200. A front end of the beam member 400 is inserted into the rear opening 366 of the lower member 300. The beam member 400 may be inserted nearly or all the way through an interior of the lower member 300. The front end 410 of the beam member 400 may slide or pass through the front opening 336, such that a substantial portion of the beam member 400 is positioned beneath the upper member 100.

In this aspect, the front opening 336 is provided with a reinforcing collar that strengthens the front opening 336. Likewise, the rear opening 366 is strengthened with a reinforcing collar. The reinforcing collars and may circumscribe or nearly fully surround the front opening and the rear opening, respectively The lower member 300 further includes a side surface 334. The side surface 334 defines pin openings 394. The pin openings 394 provide for a pin 470 to pass through the lower member 300 of the towing system 40 and through the beam member 400 in order to lockingly fix the beam member 400 in position in the interior of the lower member 300. The lower member 300 further includes vertical supports 396 that further strengthen the lower member 300. The vertical supports 396 are welded to a top widened support plate 380 and to a bottom widened support plate 390.

The side surface 334 further includes chain mounting members 392 to receive a transport chain or other hoisting or lifting apparatus, which may be used to lift or hoist the towing system 40. The chain mounting members 392 provide a connection point for chains or other hoisting implements in order for an operator to attach or connect to the towing system 40 and lift the towing system 40.

With reference to FIG. 1, the top widened support plate 380 is shown. The top widened support plate 380 includes an axle stop 383 and holes 386. In the embodiments shown in the FIGURES, U clamps pass over the front axle assembly and insert through the holes 386 and are fastened in place with locking nuts, locking pins, etc. The top widened support plate 380 provides a broad surface for the front axle assembly to rest upon. As the top widened support plate 380 widens as it approaches the axle stop 383, a broad base is provided for the front axle assembly of the second truck 20 that reduces rocking or shaking of the second truck 20 when it is positioned on the top widened support plate 380 of the lower member 300.

A lower surface of the top widened support plate 380 is welded to the vertical supports 396, while an upper surface of the bottom widened support plate 390 is welded to the vertical supports 396. The vertical supports 396 are further welded to the side surfaces 334 of the lower member 300. In other embodiments, the front axle assembly may be positioned on the top widened support plate 380 and fastened with chains, bolts, fasteners, or other conventional mechanical apparatus that may be used to attach the front axle assembly to the lower member 300.

The beam member 400 will now be described with reference to FIG. 1. The beam member 400 includes a front end and the rear end 450. As shown in FIG. 1, pin openings 430 are positioned on an exterior of the beam member 400 and travel through the interior width of the beam member 400. The beam member 400 may include an I-beam construction with an upper surface 422 and a lower surface 424. A vertical support plate 420 further supports the upper surface 422 and the lower surface 424 of the beam member 400. The vertical support plate 420 reinforces and strengthens the beam member 400.

A cross-bar assembly 500 connects a rear portion of the second truck 20 to the towing system 40. The cross-bar assembly 500 includes a lower cross-bar 505 and an upper cross-bar 600. The lower cross-bar 505 connects or engages to the rear end 450 of the beam member 400. The upper cross-bar 600 rests or positions on the rear frame 26 of the second truck 20. In this aspect, chains 624 and 628 connect the lower cross-bar 505 and the upper cross-bar 600. In other aspects, connectors such as cables, belts, straps, poles, brackets, rods, buckles, etc. may connect the lower cross-bar 505 and the upper cross-bar 600.

The cross-bar assembly 500 is dimensioned to position the chains 624 and 628 or other connectors outside of the rear frame 26 of the second truck 20 (the towed truck). Batteries, components, and electrical motor parts, which are common to an electric truck, do not interfere with the chains 624 and 628. The upper cross-bar 600 may rest or be positioned on a top of the rear frame 26 of the second truck 20.

In the aspect of FIGS. 1-16, the lower cross-bar 505 includes a coupling member 510 positioned between a first lower lateral side 530 of the lower cross-bar 505 and a second lower lateral side 550 of the lower cross-bar 505. The first lower lateral side 530 and the second lower lateral side 550 extend outward and beyond a width of the rear frame 26. The chains 624 connect the first lower lateral side 530 and a first upper lateral side 630 of the upper cross-bar 600, and the chains 628 connect the second lower lateral side 550 with a second upper lateral side 650 of the upper cross-bar 600. The first lower lateral side 530, the first upper lateral side 630, the second lower lateral side 550, and the second upper lateral side 650 are shaped and dimensioned to position the chains 624 and 628 to sides of the rear frame 26. In this aspect, the chains 624 and 628 do not pass through a central portion 28 of the rear frame 26 in order to connect the lower cross-bar 505 and the upper cross-bar 600. The cross-bar assembly 500 is well suited for towing assemblies used for towing electric vehicles. Both the lower cross-bar 505 and the upper cross-bar 600 may be provided in different widths to accommodate different sized frames of the towed truck. Of course, the cross-bar assembly 500 may also be utilized when towing conventional trucks.

Figure 8:
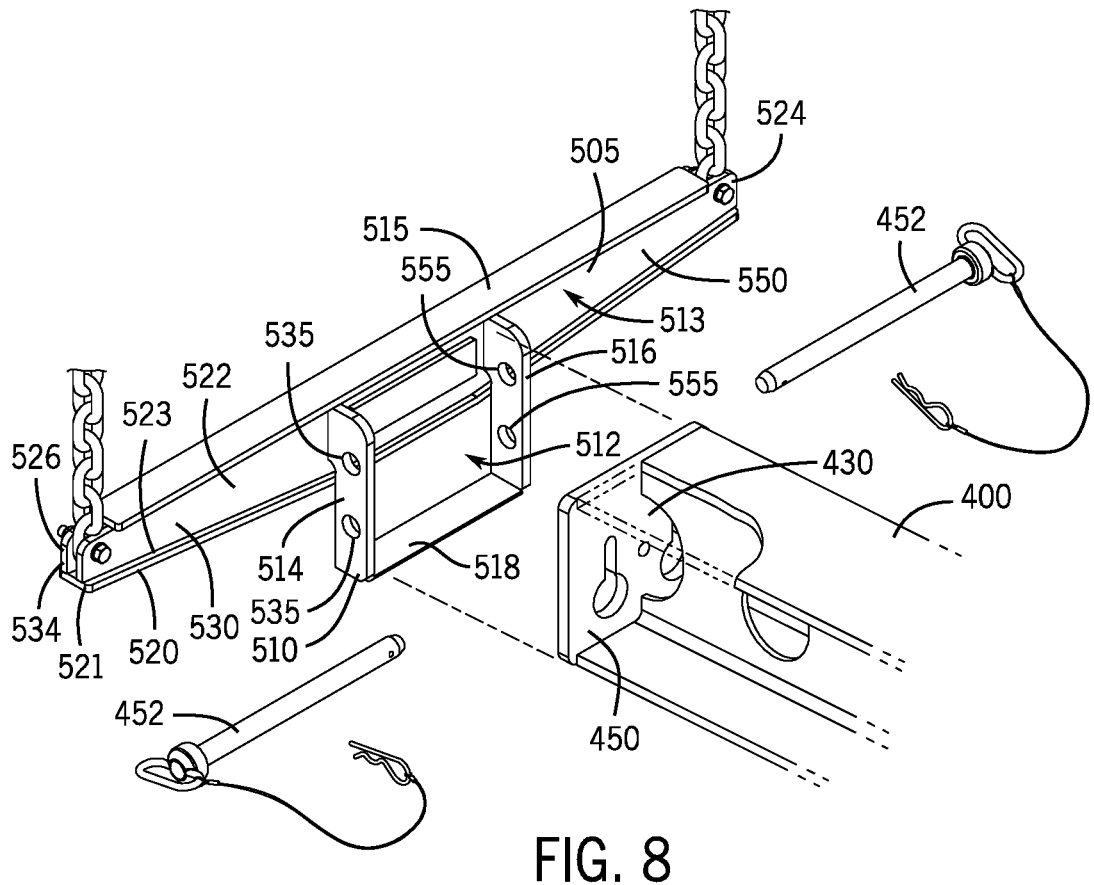
FIG. 8 is an exploded view of the connection between the rear end of the beam member and the cross-bar assembly.

With reference to FIG. 8, the rear end 450 of the beam member 400 connects or engages to the coupling member 510. In this aspect, the coupling member 510 is formed by a first lateral member 514, a second lateral member 516, and a bottom member 518. The rear end 450 of the beam member 400 fits into a central opening 512 of the coupling member 510. The central opening 512 is a receiver-like structure just larger than an exterior diameter of the rear end 450. In this aspect, the bottom member 518 of the coupling member 510 connects the first lateral member 514 and the second lateral member 516, which forms the central opening 512. In this aspect, the central opening 512 has a generally box-like or four-sided shape, which receives the four-sided shape of the rear end 450 of the beam member 400.

With continued reference to FIG. 8, the first lateral member 514 of the coupling member 510 includes one or more sets of openings 535 that pass through the first lateral member 514. Similarly, the second lateral member 516 of the coupling member 510 includes one or more sets of openings 555 that pass through the second lateral member 516. Removable fasteners 452, such a bolts, pins, cotter pins, rods, spring clips, etc. pass through the openings 535, the pin openings 430 near the rear end 450 of the beam member 400, and the openings 555 and are fastened in place. The removable fasteners 452 secure the rear end 450 of the beam member 400 into the coupling member 510.

Figure 9:
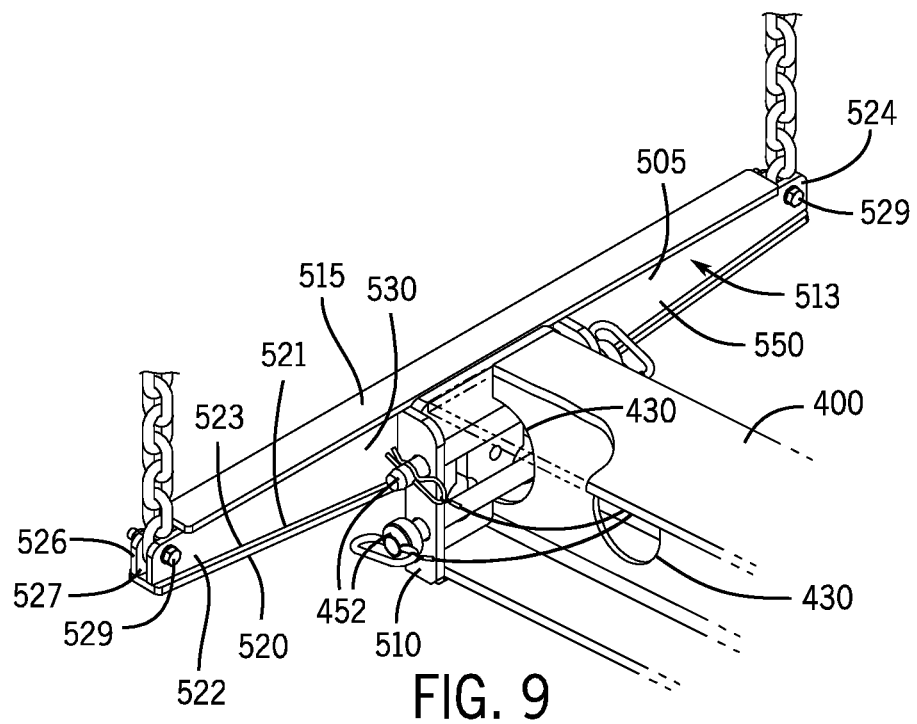
FIG. 9 is a perspective view of the connection between the rear end of the beam member and the cross-bar assembly
Figure 10:
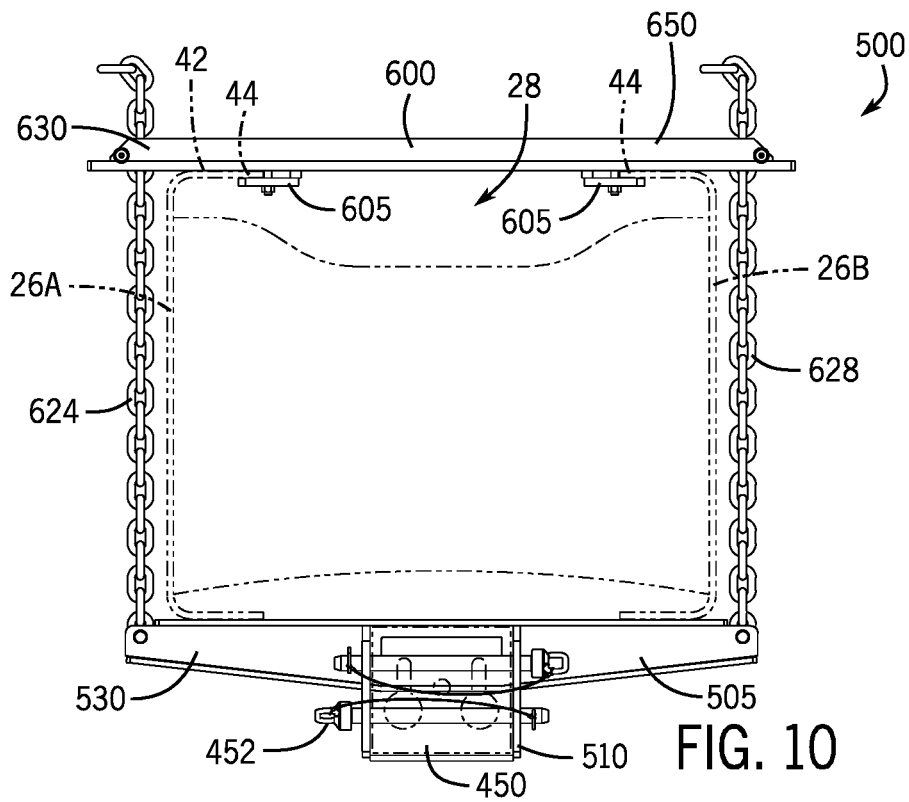
FIG. 10 is a view of the cross-bar assembly engaged to the frame.

With reference to FIG. 9, in this aspect, the lower cross-bar 505 is formed from an upper portion 515, a lower portion 520, a forward portion 522, and a rear portion 526. The upper portion 515, the lower portion 520, the forward portion 522, and the rear portion 526 are generally welded or fastened together in a box-like fashion. The forward portion 522 and the rear portion 526 are welded to the upper portion 515 and the lower portion 520 such that a space 527 is formed between the forward portion 522 and the rear portion 526. Fasteners 529 connect the forward portion 522 and the rear portion 526 and pass through the space 527. The chains 624 and 628 may fit into the space 527 and the fasteners 529 pass through the chains 624 and chains 628 such that chains 624 and chains 628 are engaged to the first lower lateral side 530 and second lower lateral side 550. In other embodiments, the lower cross-bar 505 may include other mechanical structures or components to affix to the chains 624 and chains 628. In this aspect, the upper portion 515 is shorter in width than the lower portion 520 to provide space to accommodate the chains 624 and the chains 628.

Figure 6:
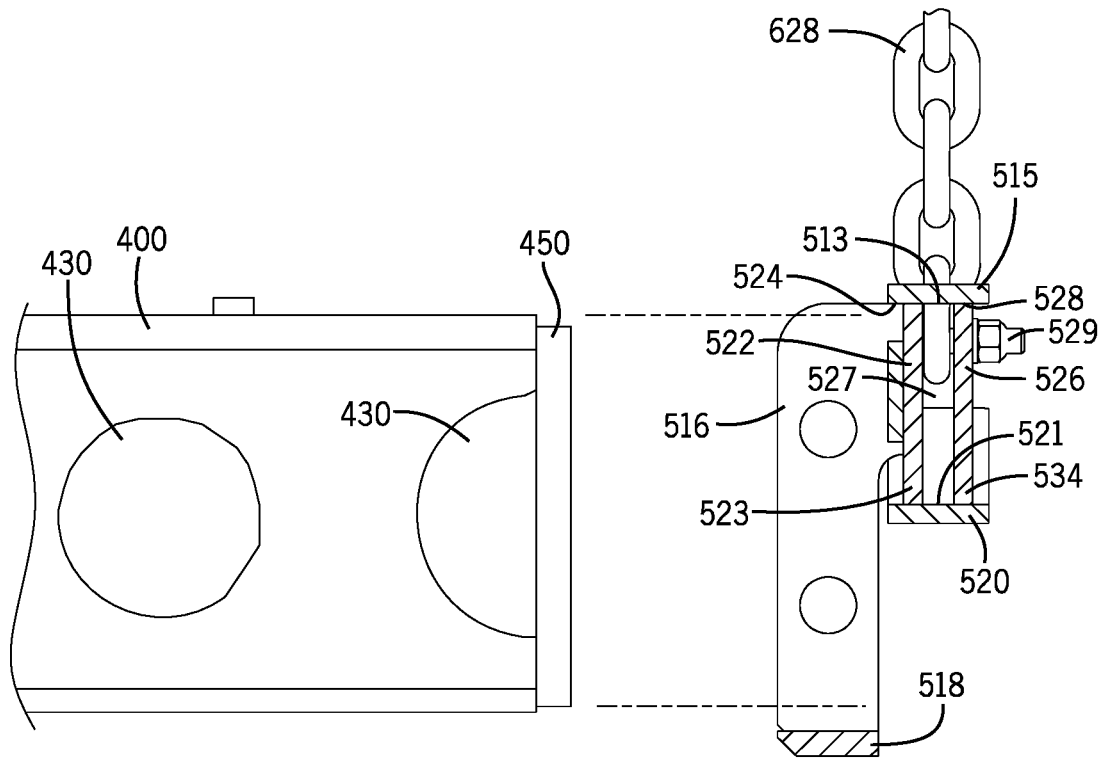
FIG. 6 is a side view of the connection between the rear end of the beam member and the cross-bar assembly.
Figure 7:
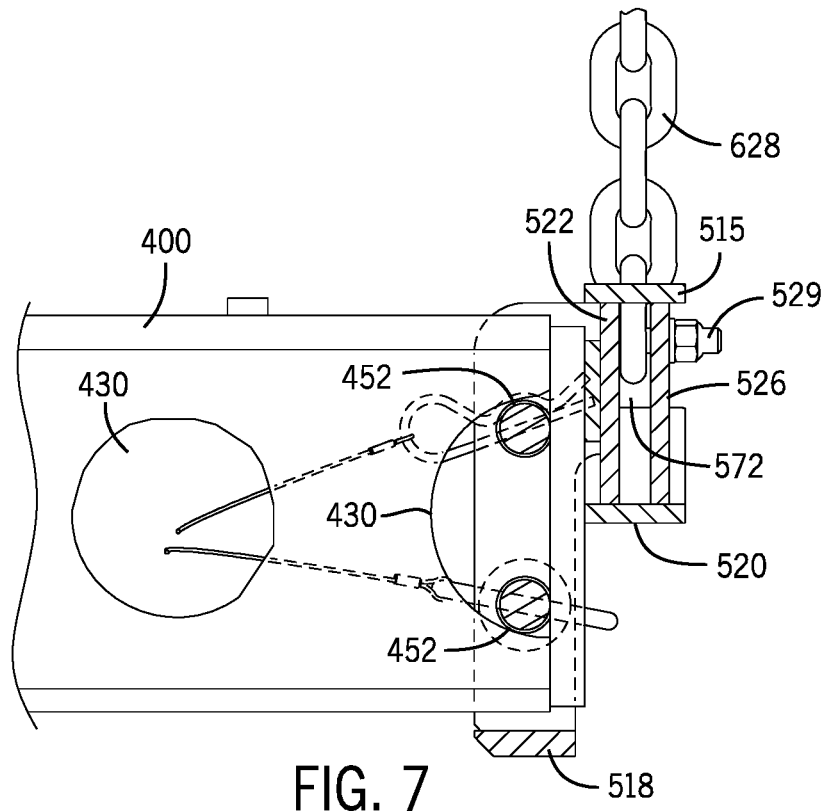
FIG. 7 is a side view of the connection between the rear end of the beam member and the cross-bar assembly.

In this aspect, the lower portion 520 may include a v-shape or other angled shape. With reference to FIG. 6, a lower edge 523 of the forward portion 522 may be welded to an upper surface 521 of the lower portion 520. Similarly, a lower edge 534 of the rear portion 526 may be welded to the upper surface 521 of the lower portion 520. An upper edge 524 of the forward portion 522 may be welded to a lower surface 513 of the upper portion 515. Similarly, an upper edge 528 of the rear portion 526 may be welded to the lower surface 513 of the upper portion 515.

In this aspect, the coupling member 510 is welded to a front surface of the forward portion 522. A rear surface of the first lateral member 514 is welded to the front surface of the forward portion 522. A rear surface of the second lateral member 516 is welded to the front surface of the forward portion 522.

The upper cross-bar 600 may connect, engage, or otherwise affix to the rear frame 26 of the second truck 20. The chains 624 and 628 fix or engage with the upper cross-bar 600.

In the aspect of FIGS. 2, 3, 10, and 11, the upper cross-bar 600 is illustrated with an optional second upper cross-bar 601. Either of the upper cross-bar 600, the second upper cross-bar 601, or other upper cross-bars (without clamps or positioners) may be used with the towing system 40. As described below, the upper cross-bar 600 and the second upper cross-bar 601 differ in their engagement to the rear frame 26.

The upper cross-bar 600 clamps to the rear frame 26 of the second truck 20. A lower surface 602 of the upper cross-bar 600 includes one or more clamps 605. The clamps 605 may include a fixed or adjustable style of clamp. In this aspect, the one or more clamps 605 include openings directed outwards or away from a center of the of the upper cross-bar 600. The user may lay the upper cross-bar 600 on an upper surface 42 of the rear frame 26 at a slight angle to perpendicular, and then twist the upper cross-bar 600 to a generally perpendicular angle to the rear frame 26, which urges edges 44 of the rear frame 26 into openings 608 of the clamps 605.

Figure 3:
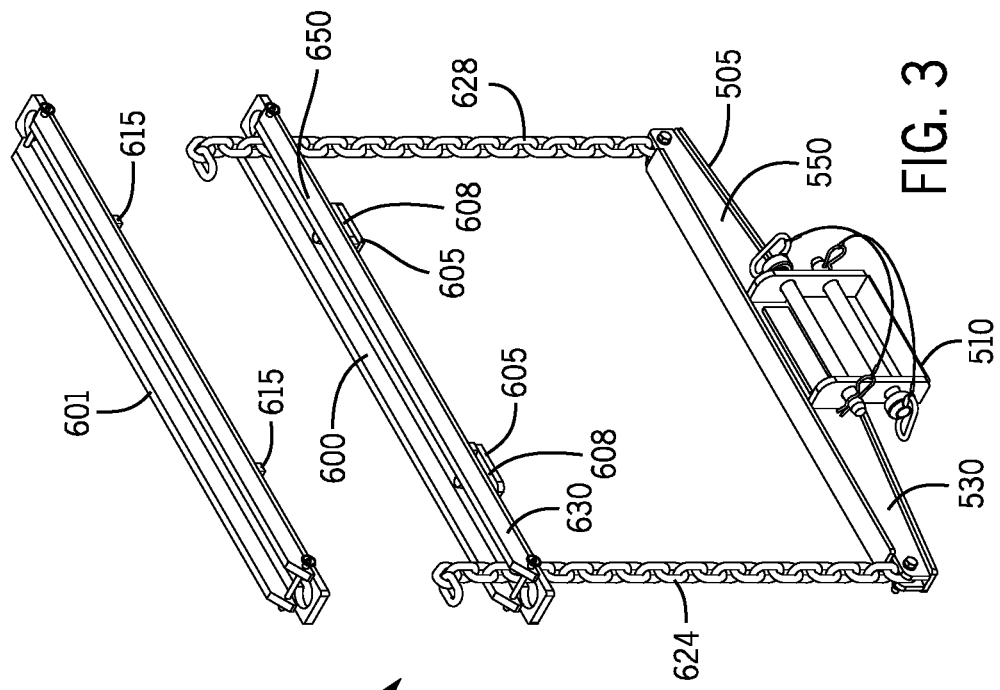
FIG. 3 is an upper perspective view of cross-bar assembly of the truck towing system.
Figure 2:
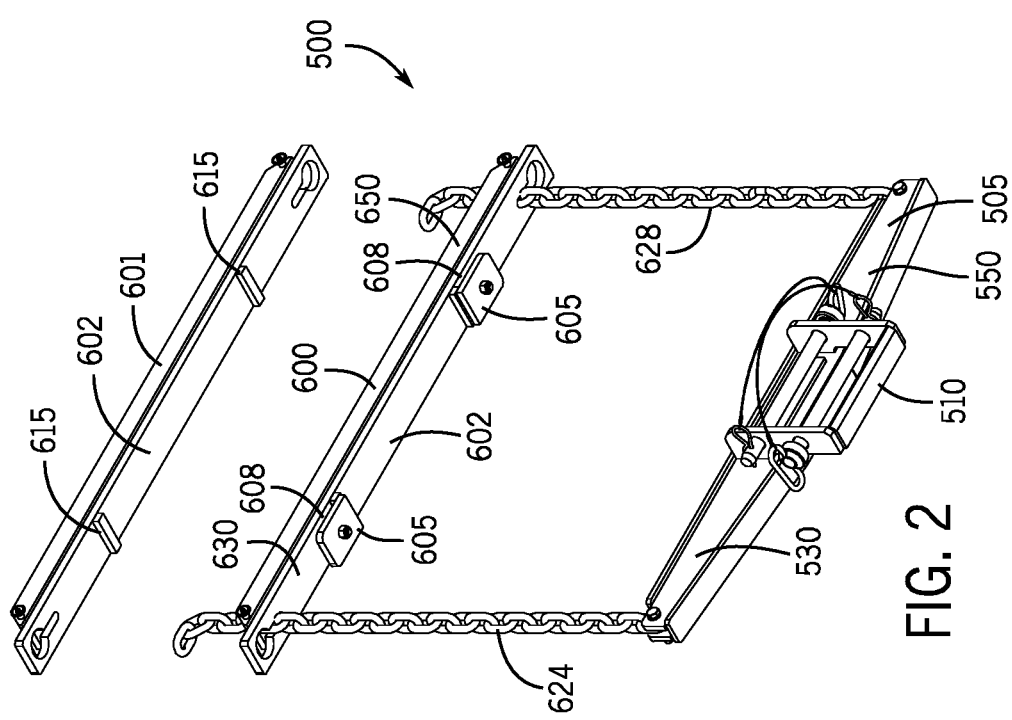
FIG. 2 is a lower perspective view of cross-bar assembly of the truck towing system.
Figure 11:
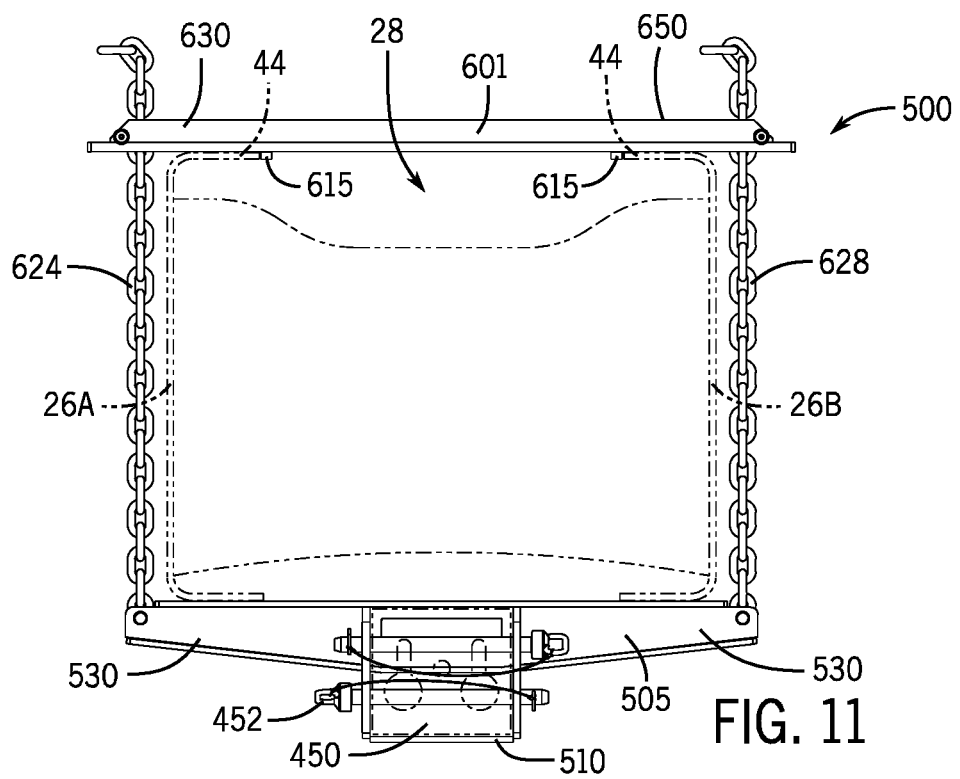
FIG. 11 is a view of the cross-bar assembly engaged to the frame.
Figure 12:
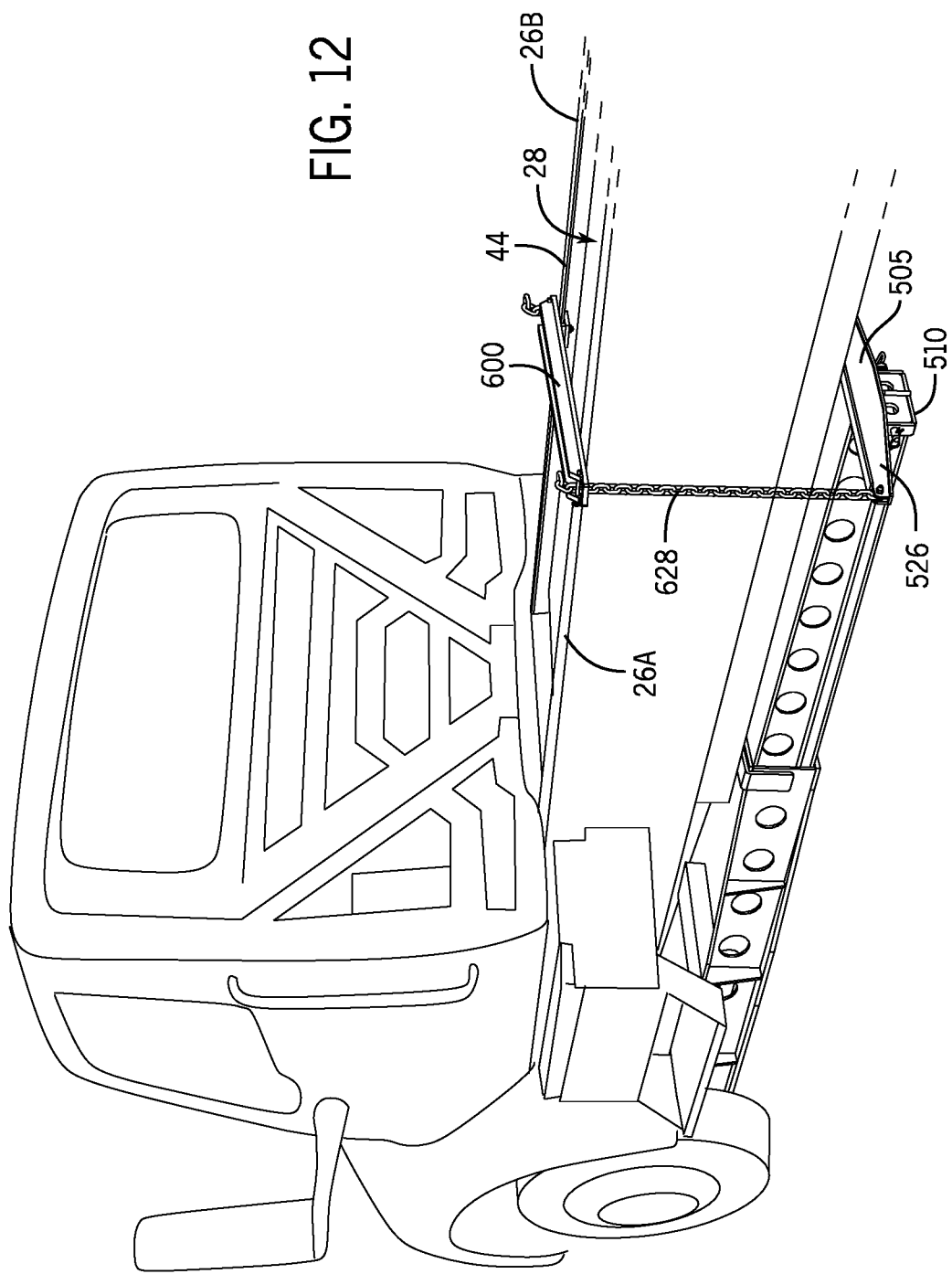
FIG. 12 is a rear perspective view of the cross-bar assembly engaged to the frame.
Figure 13:
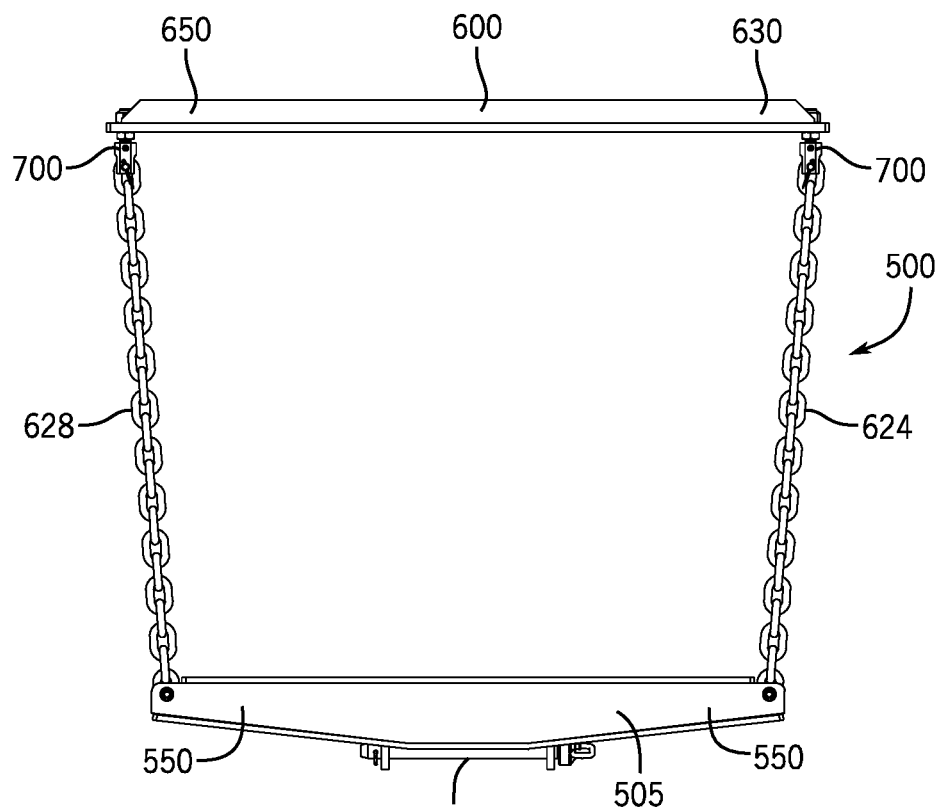
FIG. 13 is a rear view of the cross-bar assembly with the connection assembly.

In the aspect of FIGS. 2, 3, and 11, a bottom surface of the second upper cross-bar 601 rests over a top of the rear frame 26 of the second truck 20, and the chains 624 and 628 holds to the upper cross-bar 600 to the beam member 400. In this aspect, the lower surface 602 of the second upper cross-bar 600 includes one or more positioners 615 spaced to fit between rear frame members 26A and 26B. The one or more positioners 615 assist in holding or maintaining the position of the upper cross-bar 600 relative to the rear frame 26.

The rear end 450 of the beam member 400 may include other mechanical structures or components to affix to the cross-bar assembly 500. For example, the coupling member 510 may bolt directly to the rear end 450. For example, the lower cross-bar 505 may bolt directly to the rear end 450.

The length of the chains 624 and 628 may be adjusted to raise or lower the rear of second truck 20. Generally, the front and rear sets of the rear wheels tandem 29 of the second truck 20 should be in contact with the ground to provide better control and braking of the second truck 20. The length of the chains 624 and 628 between the lower cross-bar 505 and the upper cross-bar 600 may be lengthened to lower the front set of the rear wheels tandem 29. Likewise, the length of the chains 624 and 628 between the lower cross-bar 505 and the upper cross-bar 600 may be shortened to raise the front set of the rear wheels tandem 29.

With reference to FIG. 4, in this aspect, the beam member 400 is adjustable in length relative to the lower member 300. The overall length of the towing system 40 may be adjusted by extending and withdrawing the beam member 400 relative to the lower member 300. The beam member 400 slides in and out of the interior of the lower member 300. The upper surface 422 and the lower surface 424 of the beam member 400 may slide against the interior surfaces of the lower member 300. The circumference or outer surfaces of the beam member 400 should be just smaller than the interior circumference or inner surface of the lower member 300 such that the beam member 400 is held in a secure engagement. As shown in FIG. 1, the lower member 300 and beam member 400 may have box or square cross-sections that provide support and strength to the towing system 40. The operator may select one of the one or more sets of the pin openings 394 that are spaced along the length of the lower member 300. The operator may further choose one of the one or more sets of the pin openings 430 along the length of the beam member 400. This allows a range of length of the towing system 40 that may be used to accommodate different size or types of semi-trucks.

In this aspect, the beam member 400 may be withdrawn through the interior of the lower member 300 and through the front opening 336 such that much of the beam member 400 is directly underneath the upper member 100. This allows the towing system 40 to collapse into a more convenient storage size. The towing system 40 may further lock in the collapsed configuration. Of course, the cross-bar assembly 500 be used with towing systems having a fixed or non-collapsible beam member.

The towing system 40, by virtue of the extendable beam member 400, provides a range of extension between 0 and approximately 3 linear feet to accommodate a variety of different semi-trucks. When the towing system 40 is in the fully extended configuration, it has an overall length of approximately 18 feet. When the towing system 40 is in the collapsed configuration, it has an overall length of approximately 10 feet.

The semi-trucks that may be towed with the towing system 40 may weigh approximately 5,000 to approximately 10,000 pounds. The towing system 40 may weigh approximately 1,600 pounds. The beam member 400 includes at least one set of the pin openings 430 and may include up to five or six sets of the pin openings 430. The lower member 300 includes at least one set of the pin openings 394 and up to approximately five or six sets of the pin openings 394.

The method of operation of the towing system 40 will now be described. First, the towing system 40 is laid flat on the ground. The beam member 400 is extended or retracted relative to the lower member 300 until it is at the proper length for the second truck 20. The pin 470 is then inserted through the pin openings 394 in the lower member 300 and through the pin openings 430 of the beam member 400. The pin 470 is locked in place via a cotter pin, nut or the like. Next, the second truck 20 is driven over the lower member 300 and the beam member 400. Next, the U clamps re positioned over the front axle assembly and tightened such that the front axle assembly is clamped or fixed to the lower member 300. Next, the rear end 450 of the beam member 400 is engaged to the coupling member 510 of the lower cross-bar 505. The upper cross-bar 600 is positioned over the rear frame 26 of the second truck 20, and the chains 624 and 628 connect the lower cross-bar 505 with the upper cross-bar 600.

A crane, hoist, or other lifting implement next lists the upper member 100 to a sufficient height to where the first truck 10 may back or move underneath the saddle mount portion 124. Next, the upper member 100 is lowered until the saddle mount portion 124 of the towing system 40 is positioned in the saddle mount 15 of the first truck 10. The saddle mount 15 is then locked to the saddle mount portion 124. As such, the towing system 40 is now connected to the first truck 10, and the second truck 20 is supported via the towing system 40. The rear wheels tandem 29 of the second truck 20 are in contact with the ground, while the front wheels 27 of the second truck 20 are approximately 6" to approximately 12" off and above the ground.

With reference to FIG. 1, in this aspect, the towing system 40 collapses to a collapsed configuration for efficient storage and convenient maneuverability. The beam member 400 is withdrawn or retracted through the interior of the lower member 300 and through the front opening 336 such that much of the beam member 400 is directly underneath the upper member 100. The beam member 400 may be locked in place with the pin 470. In this collapsed configuration, a center of gravity of the towing system 40 is positioned approximately in the middle of the collapsed towing system 40. The chain mounting members 392 provide the connection point for chains or other hoisting implements in order for an operator to attach or connect to the towing system 40 and lift the towing system 40. Thus, the towing system 40 may be safely lifted at its middle point without the towing system 40 twisting or torqueing on the transport chain. Due to its compact size, up to approximately 25 of the towing systems 40 may be stored on a standard flatbed trailer.

In other aspects, the cross-bar assembly 500 may be used with other towing assemblies. The use of the cross-bar assembly 500 is not limited to towing systems 40 with a collapsible beam member 400. For example, the cross-bar assembly 500 may be used with towing assemblies that have a fixed beam member 400, a one-piece lower member 300 that lacks a beam member 400, a rigid combination of the lower member 300 and the beam member 400, etc.

With respect to FIGS. 13-16, the cross-bar assembly 500 is shown with connection assemblies 700. The connection assemblies 700 engage or secure the chains 624 and 628 to the first upper lateral side 630 and the second upper lateral side 650 of the upper cross-bar 600. In this aspect, each of the connection assemblies 700 includes a connection member 710 and a shaft 720. A first connection assembly 700 is positioned at the first upper lateral side 630, and a second connection assembly 700 is positioned at the second upper lateral side 650. The first and second connection assemblies 700 may include a generally similar construction.

In this aspect, the upper cross-bar 600 includes a central member 610, a front member 660, and a rear member 670. The front member 660 and the rear member 670 are arranged generally perpendicular to the central member 610 to provide support and rigidity to the upper cross-bar 600. In other aspects, the upper cross-bar 600 may only include the central member 610 or other single or double piece member. In this aspect, the central member 610 includes one or more openings 616 at each of a first lateral side 612 and a second lateral side 614 of the central member 610. The shaft 720 engages to one of the openings 616 to hold the connection assembly 700 to the upper cross-bar 600. The shaft 720 may include a threaded stud.

Figure 14:
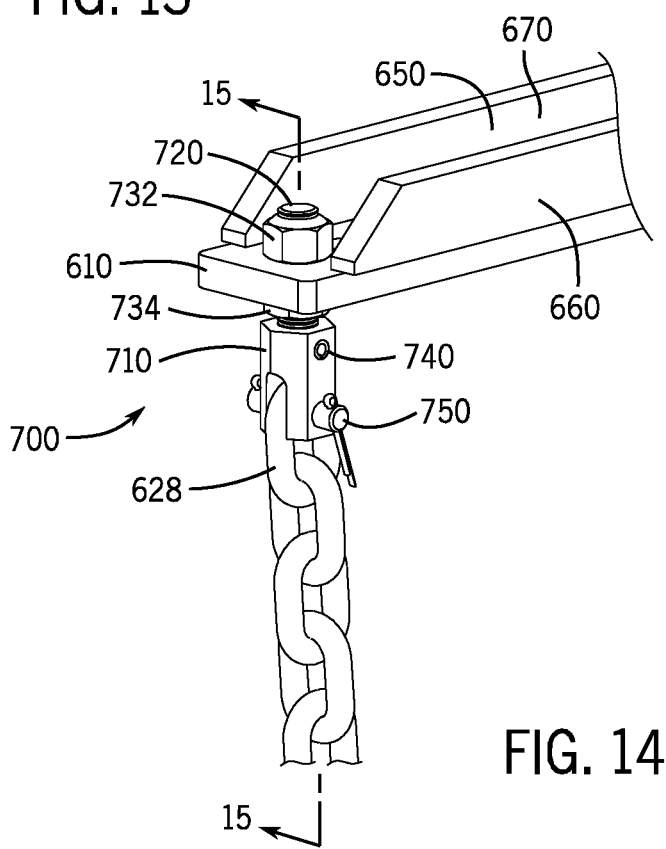
FIG. 14 is a perspective view of the cross-bar assembly with the connection assembly.

With respect to FIGS. 14-16, the first connection assembly 700 at the first upper lateral side 630 is shown. With respect to FIGS. 15 and 16, the shaft 720 includes an upper threaded end 722 and a lower threaded end 724. The shaft 720 passes through one of openings 616 in the central member 610. An upper nut 732 is threadably engaged to the upper threaded end 722 of the shaft 720. A lower nut 734 is threadably engaged to the lower threaded end 724 of the shaft 720. The nuts 732 and 734 secure the shaft 720 to the central member 610.

The connection member 710 includes an upper opening 712 that receives the lower threaded end 724 of the shaft 720. The upper opening 712 leads to a central opening 714 that is sized and configured to receive the lower threaded end 724 of the shaft 720. A pin 740 may insert through a side opening 713 of the connection member 710 and into a side opening 726 of the lower threaded end 724 of the shaft 720. The pin 740 may fixedly engage or stake the connection member 710 to the shaft 720.

A lower portion of the connection member 710 is configured to engage with the chain 624 or 628. In this aspect, the lower portion of the connection member 710 includes a cavity 715 sized and configured to receive an end loop of the chain 624 or 628. In this aspect, a cotter pin 750 passes through openings 716 and 718 of the connection member 710 to secure the end loop in the cavity 715. In others aspect, the connection member 710 may include other clips, clasps, loops, opening, etc. to engage or secure to the chain 624 or 628. For example, a nut and bolt and may pass through the end loop of the chain and an opening of the lower portion of the connection member 710.

The connection assemblies 700 may provide for vertical and/or horizontal adjustment. For example, the shaft 720 may be raised or lowered in the opening 616 of the central member 610, as preferred by the user, and secured in place with the upper nut 732 and the lower nut 734. By raising and lowering the shaft 720, the connection member is similarly moved, and thus raising or lowering a connection point for the chain 624 or 628. This provides the vertical adjustment. In other aspects, different lengths of shafts 720 may be provided with the upper cross-bar 600 to increase vertical adjustability. With respect to FIG. 16, the central member 610 may include multiple openings 616 spaced in different lateral locations on the central member 610 to move the connection assembly 700 laterally. For example, the chains 624 and 628 may be moved closer or further from the rear frame 26 by selecting different openings 616 on the central member 610 for the shaft 720. This provides the horizontal adjustment. The vertical and/or horizontal adjustment assists in adapting or configuring the cross-bar assembly 500 to different makes, models, and/or styles of trucks.

In other aspects, the upper nut 732 may be integral or permanently fixed to the upper end of the shaft 720. For example, a hex head bolt with a side opening in the shaft may be used in place of the shaft 720 and upper nut 732.

It should be understood from the foregoing that, while particular embodiments of the invention have been illustrated and described, various modifications can be made thereto without departing from the spirit and scope of the present invention. Therefore, it is not intended that the invention be limited by the specification; instead, the scope of the present invention is intended to be limited only by the appended claims.

What is claimed is:

1. A truck towing system, comprising:
   an upper member configured to removably engage or connect with a first truck;
   a lower member, wherein the lower member joins the upper member in a fixed engagement;
   the lower member configured to support a front portion of a second truck;
   a beam member, the beam member engaged to the lower member;
   the beam member configured to connect to a rear portion of the second truck; and
   a cross-bar assembly comprising a lower cross-bar and an upper cross-bar, wherein the lower cross-bar is configured to connect or engage to a rear end of the beam member, and the upper cross-bar is configured to position on or engage with a frame of the second truck.

2. The truck towing system according to claim 1, wherein chains connect the lower cross-bar and the upper cross-bar.

3. The truck towing system according to claim 2, wherein the cross-bar assembly is dimensioned to position the chains outside of a rear frame of the second truck.

4. The truck towing system according to claim 1, wherein the lower cross-bar includes a first lower lateral side and a second lower lateral side, wherein a coupling member is positioned between the first lower lateral side and the second lower lateral side, and wherein the coupling member connects or engages to the rear end of the beam member.

5. The truck towing system according to claim 4, wherein the rear end of the beam member fits into a central opening of the coupling member.

6. The truck towing system according to claim 4, wherein the coupling member forms a receiver to engage the beam member.

7. The truck towing system according to claim 4, wherein the coupling member includes one or more sets of openings and the beam member include openings, and removable fasteners pass through the one or more sets of openings in the coupling member and the openings in the beam member.

8. The truck towing system according to claim 7, wherein the coupling member is formed by a first lateral member, a second lateral member, and a bottom member.

9. The truck towing system according to claim 7, wherein the first lateral member of the coupling member includes one or more sets of openings that pass through the first lateral member, the second lateral member includes one or more sets of openings that pass through the second lateral member, and removable fasteners are configured to pass through the openings in the first lateral member, an opening in the rear end of the beam, and the openings in the second lateral member.

10. The truck towing system according to claim 1, wherein the lower cross-bar includes a first lower lateral side and a second lower lateral side, wherein the lower lateral side and the second lower lateral side extend outward and beyond a width of a rear frame of the second truck.

11. The truck towing system according to claim 1, wherein the lower cross-bar includes a first lower lateral side and a second lower lateral side, wherein the first lower lateral side and the second lower lateral side extend outward and beyond a width of a rear frame of the second truck, and wherein the upper cross-bar includes a first upper lateral side and a second upper lateral side, wherein the first upper lateral side and the second upper lateral side extend outward and beyond the width of the rear frame of the second truck.

12. The truck towing system according to claim 1, wherein the lower cross-bar is formed from an upper portion, a lower portion, a forward portion, and a rear portion.

13. The truck towing system according to claim 12, wherein a coupling member is welded to the forward portion.

14. The truck towing system according to claim 1, wherein the lower cross-bar comprises a forward portion and a rear portion, and the forward portion and the rear portion are welded together such that a space is formed between the forward portion and the rear portion to accommodate or connect with chains.

15. The truck towing system according to claim 1, wherein the upper cross-bar clamps to a rear frame of the second truck.

16. The truck towing system according to claim 15, wherein a lower surface of the upper cross-bar includes one or more clamps.

17. The truck towing system according to claim 16, wherein the one or more clamps are fixed or adjustable clamps.

18. The truck towing system according to claim 16, wherein the one or more clamps include openings directed outwards or away from a center of the upper cross-bar.

19. The truck towing system according to claim 1, wherein the beam member slides in and out of an interior of the lower member.

20. The truck towing system according to claim 1, wherein the beam member slides in and out of an interior of the lower member, the beam member slides to a collapsed configuration, and the beam member slides to an extended configuration.

21. The truck towing system according to claim 1, wherein chains connect or engage the lower cross-bar to the upper cross-bar, wherein the upper cross-bar comprises connection assemblies to secure or connect to the chains, wherein the connections assemblies comprise a shaft that secures to an opening in the upper cross-bar and a connection member that secures or connects to the chain.

22. A truck towing system, comprising:
   an upper member configured to removably engage or connect with a towing truck;
   a lower member, wherein the lower member joins the upper member in a fixed engagement;
   the lower member configured to support a front portion of a towed truck;
   a beam member, the beam member engaged to the lower member;
   a cross-bar assembly comprising a lower cross-bar and an upper cross-bar, wherein the lower cross-bar is configured to connect or engage to the upper cross-bar via chains, and the lower cross-bar and the upper cross-bar are configured to position the chains outside of a frame of the towed truck;
   the beam member configured to connect or engage with the lower cross-bar; and
   the upper cross-bar configured to position on or engage with the frame of the towed truck.

23. A cross-bar assembly for a truck towing system, comprising:
   a lower cross-bar, wherein the lower cross-bar is configured to connect or engage to a rear end of a beam member of a truck towing system;
   an upper cross-bar, wherein the upper cross-bar is configured to connect or engage to a frame of a towed truck;
   the lower cross-bar includes a first lower lateral side and a second lower lateral side, wherein the first lower lateral side and the second lower lateral side extend outward and beyond a width of the frame of the towed truck; and
   the upper cross-bar includes a first upper lateral side and a second upper lateral side, wherein the first upper lateral side and the second upper lateral side extend outward and beyond the width of the frame of the towed truck.

24. The cross-bar assembly for a truck towing system according to claim 23, wherein chains secure or connect the lower cross-bar to the upper cross-bar, wherein the upper cross-bar comprises connection assemblies to secure or connect to the chains, wherein the connections assemblies comprise a shaft that secures or connects to an opening in the upper cross-bar and a connection member that secures or connects to the chain.

25. The cross-bar assembly for a truck towing system according to claim 24, wherein the shaft is secured to the connection member, and the connection member comprises a cavity that secures or connects to a loop of the chain.

26. The cross-bar assembly for a truck towing system according to claim 24, wherein the connection assemblies provide vertical adjustability in connecting or securing to the chains.

27. A cross-bar assembly for a truck towing system, comprising:
   a lower cross-bar;
   an upper cross-bar; and
   the lower cross-bar includes a first lower lateral side and a second lower lateral side, wherein a coupling member is positioned between the first lower lateral side and the second lower lateral side, and wherein the coupling member is configured to receive a rear end of a beam member of a truck towing system, and wherein the rear end of the beam member fits into a central opening of the coupling member.

28. The cross-bar assembly for a truck towing system according to claim 27, wherein the lower cross-bar is configured to connect or engage to the rear end of the beam member of the truck towing system, and wherein the upper cross-bar is configured to connect or engage to a frame of a towed truck.

29. A method of engaging a truck towing system to a first truck and a second truck, comprising:
   providing a truck towing system, comprising:
      an upper member configured to removably engage or connect with a first truck;
      a lower member, wherein the lower member joins the upper member in a fixed engagement;
      the lower member configured to support a front portion of a second truck;
      a beam member, the beam member engaged to the lower member;
      a cross-bar assembly comprising a lower cross-bar and an upper cross-bar;
   engaging the lower cross-bar to the beam member;
   positioning the upper cross-bar to a frame of the second truck; and
   connecting the lower cross-bar and the upper cross-bar with chains.

30. The method of engaging a truck towing system to a first truck and a second truck according to claim 29, further comprising passing the chains outside of the frame of the second truck.

* * * * *